United States Patent [19]

Mingardi

[11] Patent Number: 5,131,257
[45] Date of Patent: Jul. 21, 1992

[54] BENCH RAMPS FOR THE REPAIR OF DAMAGED VEHICLE BODYWORKS AND CHASSIS

[75] Inventor: Franco Mingardi, Budrio, Italy

[73] Assignee: Coiro S.R.L., San Martino in Argine Di Molinella, Italy

[21] Appl. No.: 721,936

[22] Filed: Jun. 27, 1991

[30] Foreign Application Priority Data

Jul. 17, 1990 [IT] Italy ................................. 3600 A/90

[51] Int. Cl.⁵ .............................................. B21D 1/12
[52] U.S. Cl. ...................................... 72/457; 72/705; 33/608
[58] Field of Search ..................... 72/457, 705; 33/608

[56] References Cited

U.S. PATENT DOCUMENTS 4,603,570 8/1986 Dehn ...................................... 72/705

FOREIGN PATENT DOCUMENTS 2711916 9/1978 Fed. Rep. of Germany ........ 33/608
2098522 11/1982 United Kingdom ................... 72/705

Primary Examiner—Lowell A. Larson
Attorney, Agent, or Firm—Herbert Dubno; Dyury Kateshov

[57] ABSTRACT

A bench ramp including a plurality of mutually perpendicular and movable bars provided with a coupling member arresting the bars in a selected position and having two threaded bars engaging one another in a locking position and a pair of rocker members swingable about a common axis extending parallel to the threaded bars.

5 Claims, 3 Drawing Sheets

BENCH RAMPS FOR THE REPAIR OF DAMAGED VEHICLE BODYWORKS AND CHASSIS

FIELD OF THE INVENTION

The present invention relates to bench ramps for the repair of damaged vehicle bodyworks and chassis.

BACKGROUND OF THE INVENTION

As is known, the essential condition for straightening repairs to damaged vehicle body bodyworks and chassis so as to carry out continuous monitoring during straightening on a bench ramp is that the vehicle is disposed on the bench ramp in a precise position defined by the lower plane of the vehicle that must be parallel to the upper support plane of the bench ramp prior to being secured thereon and the median longitudinal axis of the vehicle must coincide with the longitudinal axis of the bench ramp. If these two conditions are not met, the monitoring measurements would be inaccurate as a result of which the straightening repairs would not be carried out correctly since there would be no accurate reference points.

In order to place a damaged vehicle on a bench ramp an elevator bridge or a similar device is used which is able to lift and support the whole weight of the damaged vehicle as it supplies it above the bench ramp. In any case, as this preliminary positioning is carried out without any positional accuracy of the vehicle with respect to the bench ramp, steps must be taken thereafter to achieve the accurate relationship of superimposition until both of the above-mentioned conditions are met, after which the damaged vehicle maybe secured to the bench ramp.

In order to satisfy the above requirements bench ramps are known which are simple measuring bridges and are structured substantially to comprise a rectangular frame on which positionally adjustable means mounted and can be moved in each of three directions perpendicular to one another. These movable means is essentially slide means mounted to slide on two longitudinal beams with slide guides of the rectangular frame which in turn support transverse beams located at right angles to the first beams and on which further slide means which in turn support vertically telescopic means are mounted so that they can be slidably positioned in a similar manner. These latter vertically telescopic means are adapted to be connected in a fixed manner to points of the undamaged bodywork at the sides of the damaged portion to be straightened while the latter is successively subjected to straightening forces by chain means appropriately anchored thereto and stressed in a tensile manner. This bench ramp structure is also provided with millimetric rods for detecting the position to be imposed on the respective slide and telescopic means and with means for locking the latter in their respective positions. These latter locking mean are of the type comprising, for instance, toothed rack-type members and respective members engaging with the toothed members with corresponding locking members having clamps.

Bearing in mind that the bodyworks of vehicles tend to have increasingly curved profiles and that in order to avoid collateral component forces resulting from the straightening action on the damaged portion as is normally the case with the bench ramp structures known at present, it has been observed in practice that in order to carry out an ever more sophisticated straightening operation on the damaged portions of bodyworks it is advantageous to connect both the telescopic anchoring means at the sides of the damaged portion and the tensioning chain means in the damaged portion in a manner which is as perpendicular as possible to the respective anchoring points. Attempts to utilize such a structure have not led however to desirable results.

Objects of the Invention

It is therefore the main object of the present invention to provide improved bench ramps of the above-mentioned known type overcoming the operating limits of these known bench ramps.

A further object of the present invention is to provide improved bench ramps adapted to achieve continuous movement, i.e. ultrasensitive, adjustments for all of the means which can be slidably positioned.

Still a further object is to provide a bench ramp which has a simple structure and relatively economic in terms of cost in view of the practical results which can be achieved therewith.

SUMMARY OF THE INVENTION

These and other objects and advantages set out in further detail below are all achieved with the improved bench ramp of the invention of the type essentially formed by at least two series of three first movable means whose positions can be adjusted in corresponding directions perpendicular to one another. These first movable means being slide means mounted in turn on second slide means supporting third means which can be vertically positioned in a telescopic manner, millimeter index means being provided for the desired positioning of these first and second slide means and for the third telescopic means, and locking means also being provided to lock the first, second and third means in the desired millimetric positions. Specifically, the ramp is characterized in that millimeter index means for rotationally orienting these third vertically telescopic means in a corresponding desired azimuthal position and in that the locking means for locking these first, second and third means in the above-mentioned desired millimetric position are coupling means with members connecting together of the type with a longitudinal development and continuous course which are ultrafine and self-centering.

BRIEF DESCRIPTION OF THE DRAWING

Further characteristics and advantages of the improved bench ramp of the present invention are set out in the following specific description of a preferred practical embodiment given purely by way of example with reference to the accompanying drawing, in which.

SPECIFIC DESCRIPTION

Figure 1:
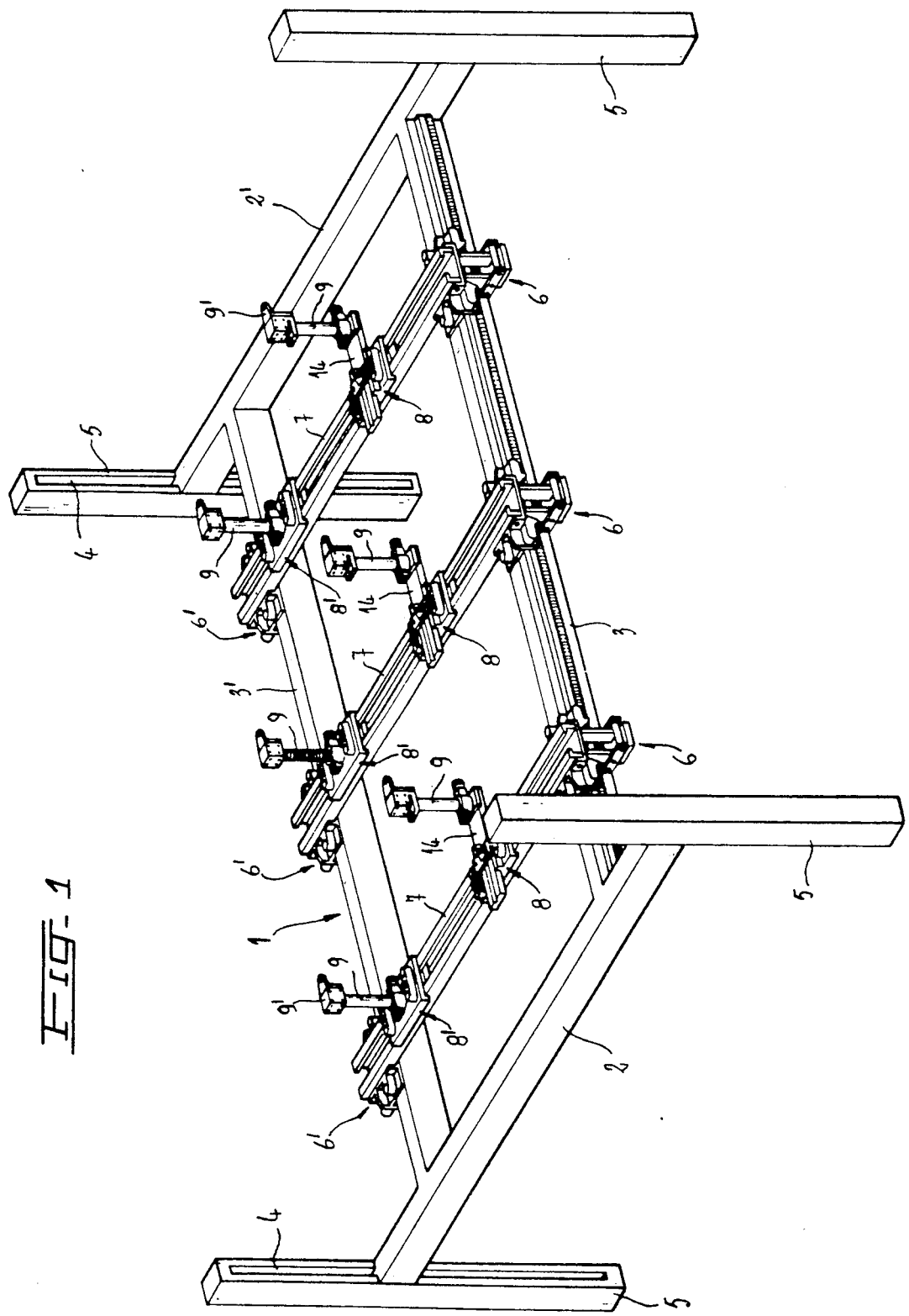
FIG. 1 is a diagrammatic isometric view of a bench ramp according to the present invention.

As mentioned above, FIG. 1 shows an improved benchramp of the present invention essentially comprising a conventional rectangular frame shown overall by 1 and having the short transverse sides 2, 2' extended beyond the longitudinal sides 3, 3' so as to engageably in vertical guides 4 provided in four uprights 5 along which it can be vertically positioned in a horizontal arrangement and locked in a known manner at the desired height or level. The two longitudinal sides 3, 3' of this rectangular frame 1 are formed by beams slide guides 3a, 3'a with which engage slide carriage counter-guide members, 6, 6' which can be slidably positioned as will be explained below in the desired position. Each pair of slide carriages 6, 6' is fixed to a corresponding transverse beam 7 having a C-shaped cross-section used with its open portion facing upwards. At lest one pair of slide carriages 8, 8' each adapted to bear means 9 with a cubic head 9' which can be telescopically positioned in the vertical direction and be slidably mounted on each transverse beam 7. Therefore it is possible to displace these means 9 with cubic head 9' in three directions, perpendicular to one another, i.e. in the longitudinal direction on and along the longitudinal beams 3,3', in the transverse direction on and along the transverse beams 7 and in the vertical direction on the slide carriages 8, 8'.

Figure 2:
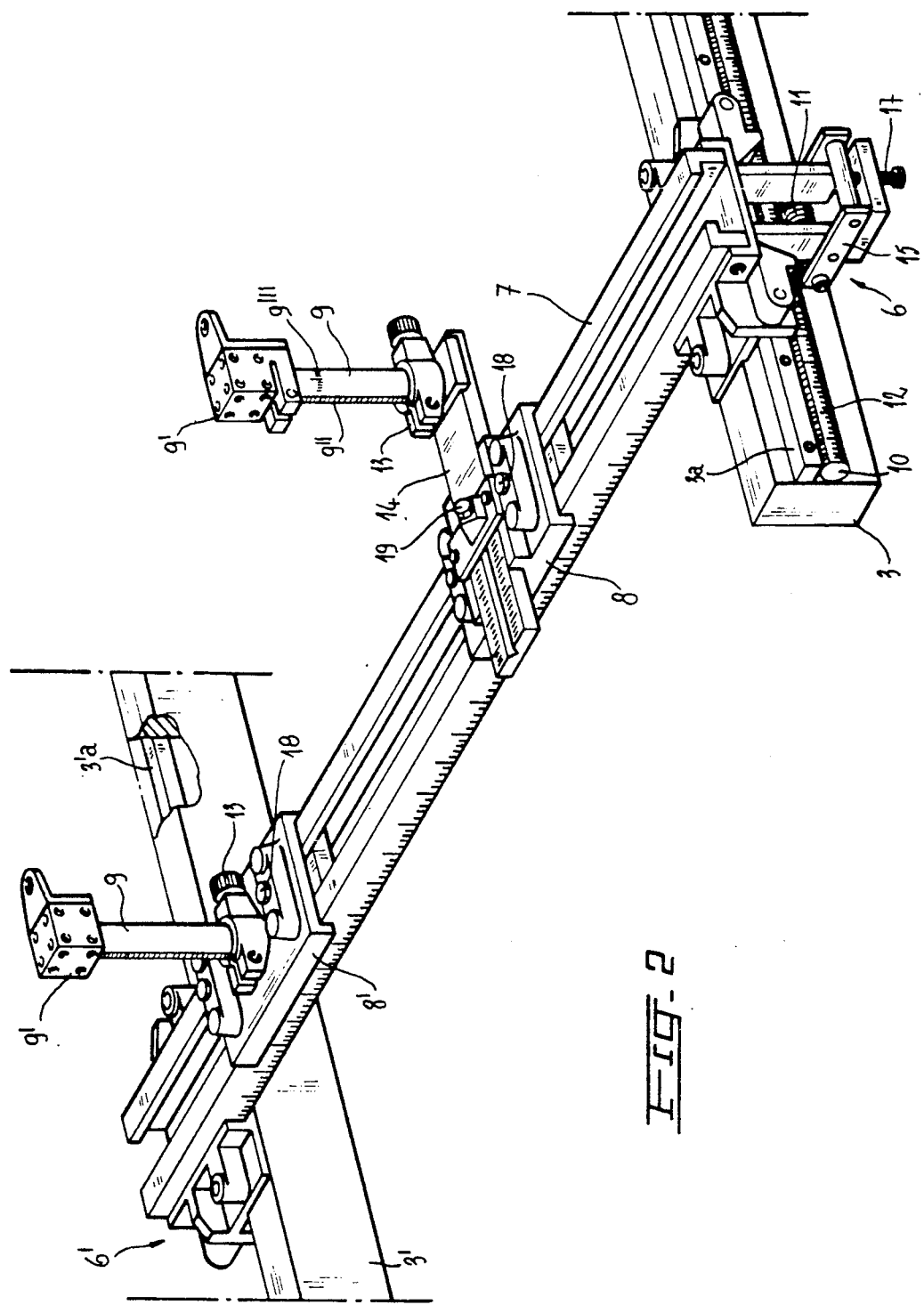
FIG. 2 is a diagrammatic perspective of part of the bench ramp of FIG. 1 shown in further detail.

In accordance with the teaching of the invention, the positioning of one or more pairs of slide carriages 6, 6' bearing the corresponding transverse beam 7 supporting the respective slide carriage 8, 8' in turn bearing respective means 9 with a cubic head 9' are adjustably positioned by the ultrafine adjustment means. These ultrafine adjustment means comprise a threaded bar 10 shown in FIG. 2 with an appropriately reduced pitch secured horizontally along the respective longitudinal beams 3, 3', with which thread a corresponding thread of a member 11 supported parallel to the threaded bar 10 by the slide carriages 6, 6' fixed there in the manner explained below is brought to cooperate by reciprocal engagement. This threaded bar 10 is also provided with a graduated scale 12 which cooperates with a vernier (not shown) with which the member 11 borne by the slide carriages 6, 6' is provided to detect the desired precise adjustment of these slide carriages 6, 6' (see FIG. 2 in particular). The slide carriages 8, 8' mounted on the transverse beams 7 and bearing the means 9 with a cubic head 9' may be optionally selected among conventional types, for instance those shown by 8', possibly improved in accordance with the teaching of the invention, or preferably of the type formed in accordance with further teaching also forming an object of the present invention, for instance those shown by 8. The means 9 with a cubic head 9' supported to be telescopically adjustable upwards by the slide carriages 8' of conventional type are provided longitudinally with a graduated scale 9" and can be locked in the adjusted position by the conventional clamp means shown overall by 13. These conventional carriages 8 are provided in accordance with the invention with a further slide 14 (see FIGS. 1 and 2) which can move longitudinally with respect to the rectangular frame 1 ad on which there are mounted the means 9 with a cubic head 9' which can be telescopically adjusted in the vertical direction provided, in addition to the vertical graduated scale 9''', with a further horizontal graduated scale 9'''' and in which the cubic head ' can be adjustably positioned in the horizontal direction and locked by means of the conventional clamp type shown overall by 13.

Figure 3:
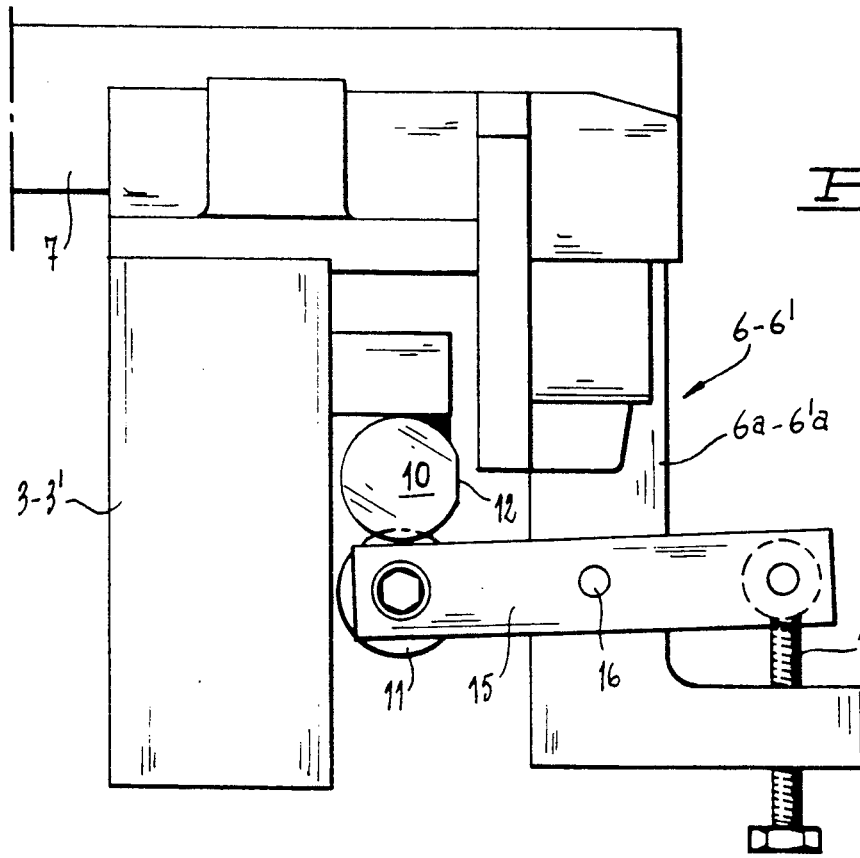
FIGS. 3 and 4 are diagrammatic side views on a further of a detail III in FIG. 2 relating to the locking of a positioning which can be adjusted in an ultrafine manner in two different positions.
Figure 4:
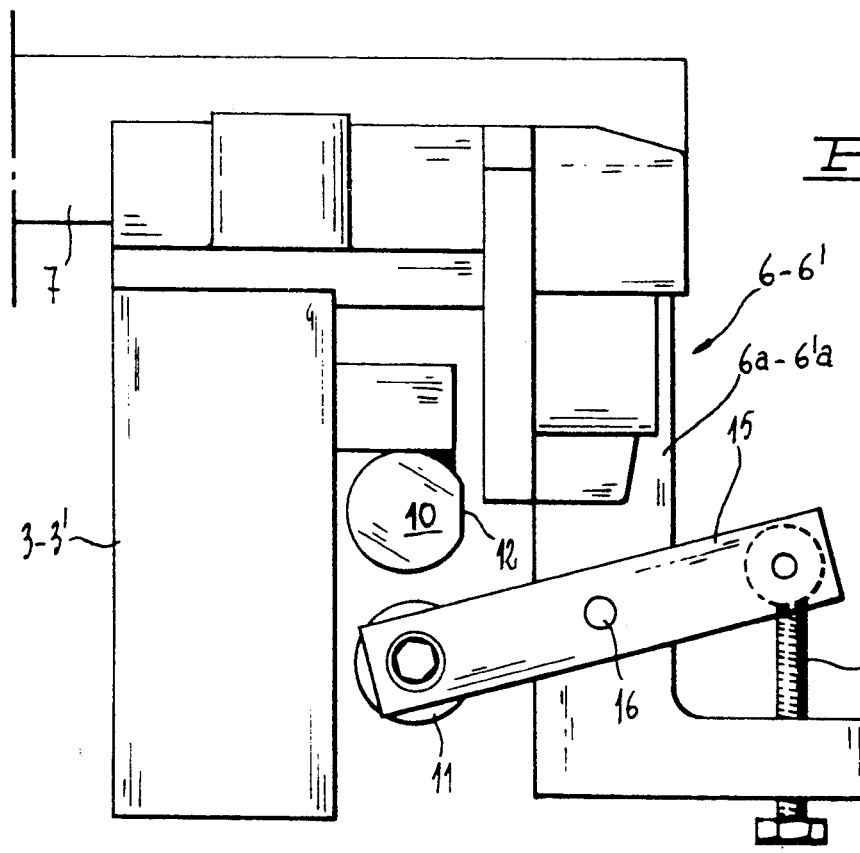

The positioning of the slide carriages 6, 6' along the longitudinal beams 3, 3' (see in particular FIGS. 3 and 4) is carried out by lever means 15 pivoting at an intermediate point at 16 on the opposite sides of a support portion 6a, 6'a extending downwards externally to the respective longitudinal beams, 3, 3' of the slide carriage 6, 6'. The free end of the lever which extends below the threaded bar 12 of the lever means 15 supports the correspondingly threaded member 11, while the end of a screw member 17 which can be screwed onto an extension extending externally and provided on the part 6a, 6'a of the slide carriages 6, 6' is connected in a known rotary manner to the other end of these lever means 15. It is therefore evident that by screwing and/or unscrewing the screw member 17, the member 11 is brought into and out of engagement with the threaded bar 12 unlocking and/or locking the slides 6, 6' in their ultrafinely adjusted longitudinal position (see in particular FIGS. 3 and 4). The locking and unlocking of the slide carriages 8, 8' along the respective transverse beams 7 is carried out by conventional means, for instance by screws 18, and the locking and unlocking of the telescopic means is also conventional, as mentioned above, using the clamp means 13, while the slide 14 is locked by inclined screw means 19 (see FIG. 2).

It has been observed in practice that the improved bench ramp of the invention achieves the above aims completely. Its embodiment has, in particular, enabled the achievement of perfect straightening of vehicle bodyworks and chassis.

The description of the improvements in question made with reference to the accompanying drawings is obviously given solely by way of example and it is therefore evident that all those modifications and variants suggested by practice and by their embodiment and use which may be made thereto come within the scope of the attached claims.

I claim:

1. A bench ramp for repairing of a damaged vehicle body work and chassis, said bench ramp comprising:
   a frame including:
      a pair of parallel elongated sides, and
      a plurality of transverse sides perpendicular to said elongated sides;
   first sliding means for displacing said transverse and elongated sides relative to one another;
   second sliding means on said transverse sides for displacing the vehicle to be repaired perpendicular to said sides;
   telescopic means on the second sliding means for displacing the vehicle to be repaired perpendicular to said transverse sides;
   index means for selecting a desired position of each of said sliding and telescopic means; and
   coupling means for arresting one of the sliding means in a respective desired position, said coupling means including:
      an elongated threaded member extending parallel to a respective one of said sides,
      a respective pair of parallel rocker arms swingable between a locking position and a releasing position about a common axis extending parallel to said threaded member,
      a threaded element mounted on inner ends of the pair of arms and extending parallel to the threaded member, and
      screw means connected with opposite ends of the pair of arms for swinging said pair of arms into said locking position and engaging said element with said member corresponding to said desired position of said sliding means.

2. The bench ramp defined in claim 1 wherein said telescopic means includes a support extending upwardly from the respective transverse side and provided with a cubic head, said cubic head being mounted on a free end of the respective support and positionally oriented in the azimuth direction.

3. The bench ramp defined in claim 1 wherein said coupling means is operatively connected with said first sliding means and mounted on said elongated sides.

4. The bench ramp defined in claim 1 wherein said threaded member is continuous and terminates at opposite ends of the respective elongated side.

5. The bench ramp defined in claim 1, further comprising guiding means for displacing said telescoping means relative to said transverse sides.

* * * * *